Figure 1:
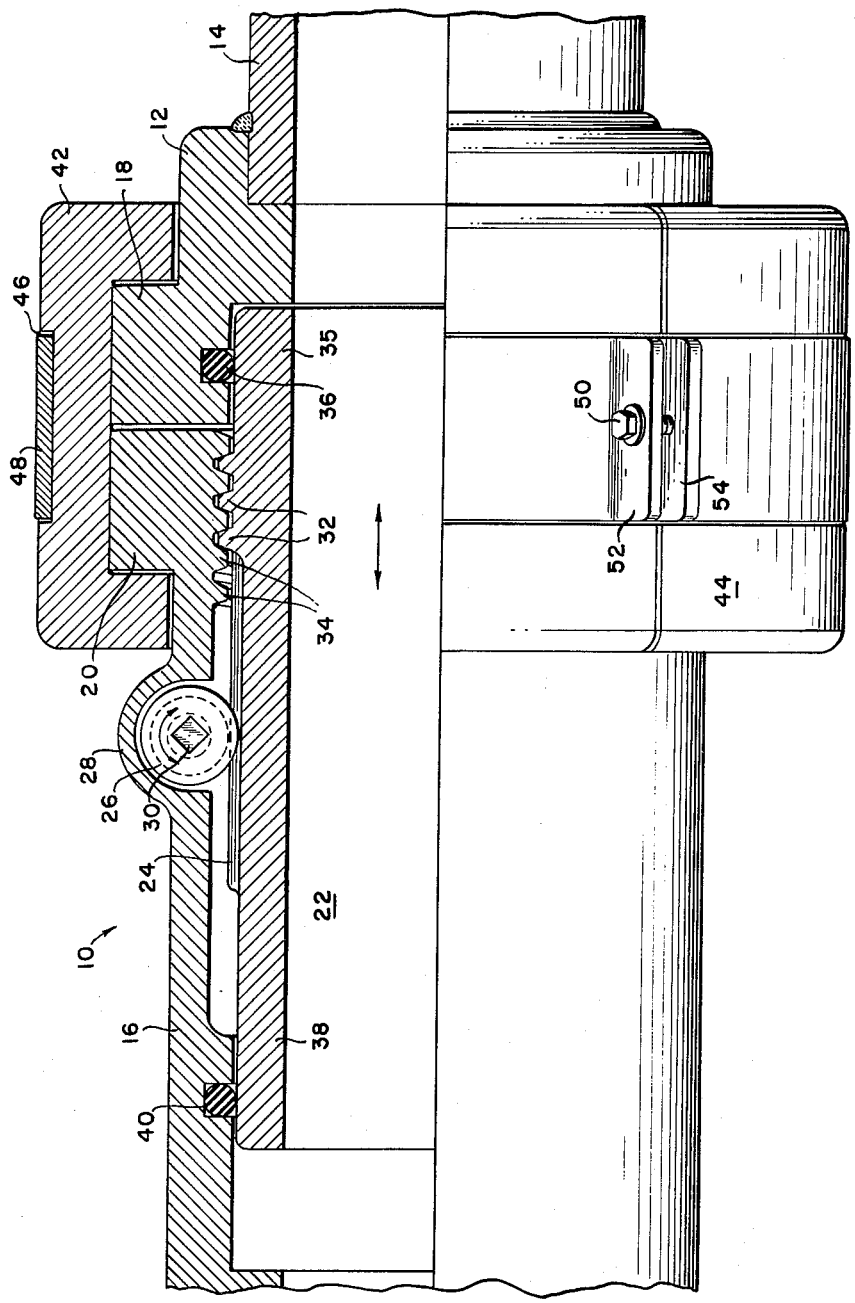

INVENTOR
HAROLD BROWNING
ATTORNEY

United States Patent Office 3,053,553
Patented Sept. 11, 1962

3,053,553
DEMOUNTABLE SIDE SLIDE COUPLING
Harold Browning, 5429 Macbeth St., Hyattsville, Md.
Filed July 7, 1959, Ser. No. 825,613
2 Claims. (Cl. 285—31)
(Granted under Title 35, U.S. Code (1952), sec. 266)

The invention described herein may be manufactured and used by or for the Government of the United States of America for governmental purposes without the payment of any royalties thereon or therefor.

This invention relates to a pipe or hose coupling and more particularly to a coupling having a retractable nipple portion.

In accordance with the prior art, most pipe or hose couplings require upon uncoupling, that one of the coupling elements be backed off from the other, or more specifically that a nipple portion on one coupling section be removed from a nipple receiving portion on a cooperating coupling section. This arrangement is generally quite satisfactory however, in certain instances there is either no room for the members to be backed off from one another or the members which are coupled are in the form of rigid pipes and will not give sufficiently to allow the coupling sections to be separated with ease. Since a pipe coupling having a nipple portion on one part thereof is particularly useful since it makes possible a better seal between the coupling sections, it has been found highly desirable that a means be provided whereby the coupling sections can be backed off from one another so that the coupling may be disassembled. It is accordingly one of the purposes of this invention to expedite the aforementioned uncoupling function.

In accordance with the instant invention a pipe coupling is provided which includes a pipe adapter section adapted to be affixed to one of the pipes or hoses to be coupled together, and having a recess therein, and another coupling section having a nipple portion adapted to be inserted into the aforementioned recess in the pipe adapter section. The invention resides in, among other things, the fact that the nipple portion of the instant coupling is retractable into the coupling section with which it is associated so as to leave said section with a flush end portion, rather than with a nipple portion extending outwardly therefrom.

It is accordingly an object of this invention to provide a pipe coupling adapted to overcome the disadvantages of the prior art, as enumerated above.

Another object of this invention is to provide a pipe coupling adapted to expedite the uncoupling of rigid longitudinally immovable pipe members.

A further object of this invention is to provide a pipe coupling having a retractable nipple portion.

An additional object of this invention is to provide a pipe coupling which may be disassembled without the need for relative longitudinal movement between the pipe members connected together by the coupling.

Figure 2:
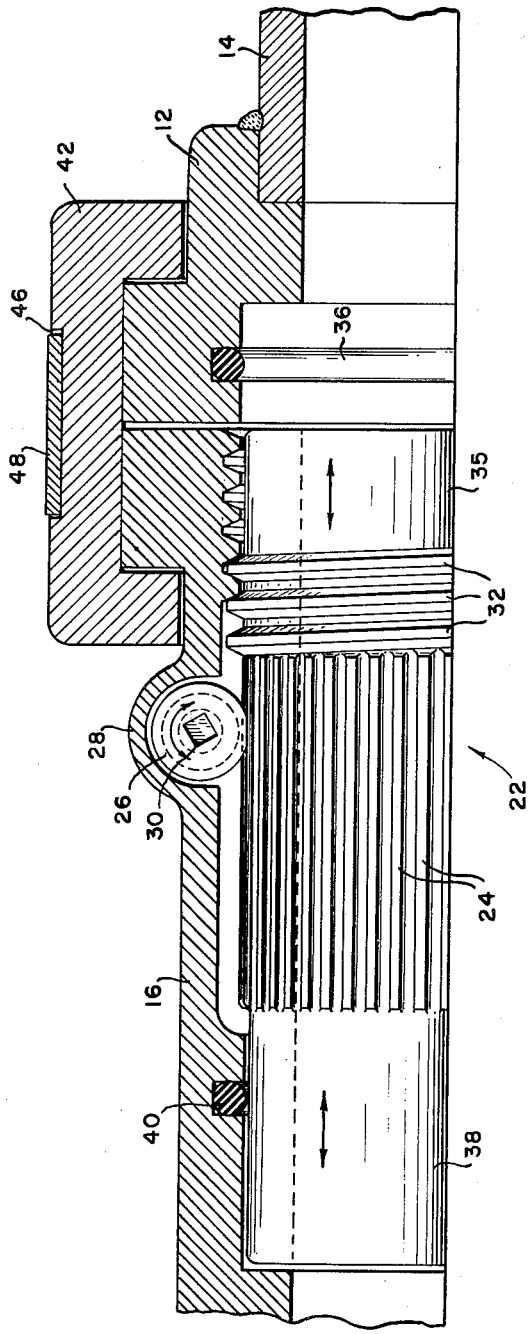

Other objects and many of the attendant advantages of this invention will be readily appreciated as the same becomes better understood by reference to the following detailed description when considered in conjunction with the accompanying drawings, wherein:

FIG. 1 is a longitudinal view, partially in section and partially broken away, of a pipe coupling constructed in accordance with the instant invention with the coupling being in a fully assembled position; and FIG. 2 is a sectional view, partially broken away corresponding to FIG. 1 wherein the coupling is shown in a partially uncoupled condition and ready for disassembly.

Referring now to the drawings wherein like reference characters designate like or corresponding parts throughout the several views, there is shown in FIG. 1 a pipe coupling assembly 10 constructed in accordance with the instant invention.

The coupling assembly 10 comprises a coupling adapter section 12 brazed or otherwise attached to a pipe or hose 14. The coupling 10 comprises another coupling section 16 adapted to be attached to another pipe or hose section and adapted to be locked to the section 12. The coupling section 12 includes an outwardly extending flange 18 adapted to abut an outwardly extending flange 20 on the coupling section 16.

In addition, the coupling section 16 includes an elongated nipple 22 that is both slidably and rotatably mounted within the coupling section 16. The nipple 22 is provided on its outer surface with a plurality of gear teeth 24 that are peripherally spaced around the surface of the nipple 22 and if desired may extend completely around the nipple. The gear teeth 24 are drivably engaged with a worm wheel 26 mounted within a suitable housing 28 formed in the coupling section 16. The worm wheel 26 is free to rotate within the housing 28 in either direction, as shown in FIGS. 1 and 2, and is held within said housing in any suitable manner. The worm wheel 26 is provided with a socket 30 at one end thereof, said socket 30 being on a portion of the worm wheel 26 which normally extends outwardly of the housing 28 so that the socket may be engaged by a crank tool or key whereby the worm wheel is adapted to be rotated.

In addition to the gear teeth 24, the nipple 22 is provided adjacent its right hand end, as viewed in FIGS. 1 and 2, with a plurality of screw threads 32 which are in engagement with a plurality of like screw threads 34 formed on the inner surface of the coupling section 16 and extending inwardly thereof. Thus as the worm wheel 26 is rotated in either direction the engagement of the screw threads on the worm wheel with the gear teeth 24 causes rotation of the nipple 22. The rotation of the nipple 22, coupled with the engagement of the screw threads 32 and 34 with one another, causes translation or longitudinal movement of the nipple 22 either toward the coupling section 12 or away from said coupling section depending upon the direction of the rotation of worm wheel 26.

It is pointed out that the right hand end of the nipple 22 is provided with a thread-free portion 35 adapted to move into the recess in the coupling section 12 formed by the outwardly extending flange 18. The outer surface of the thread-free portion 35 within the flange 18 is adapted to engage, in water tight relation, an O-ring 36 located in a suitable annular recess formed within the coupling flange 18 so as to provide a watertight fit between the right hand end 35 of the nipple 22 and the inner portion of the flange 18.

The left hand end of the nipple 22, or the innermost end thereof, is provided with a portion 38 which is free of the gear teeth 24 and the outer surface of which is in engagement with an O-ring 40 located within an annular recess formed on the inside of the coupling section 16 so as to insure a watertight fit at the left hand end of the nipple 22. Thus a watertight fit is insured between the nipple 22 and the various coupling elements when the coupling elements are in the fully assembled position, as shown in FIG. 1.

The coupling flanges 18 and 20 are held together by a pair of semi-circular clamp rings 42 and 44 each of which is substantially U-shaped in cross-section, and each of which is provided with a peripheral recess 46 formed in its outer surface. The recess 46 receives a clamp tying band 48 the ends of which are adjustably held together by screw 50 extending through a tongue 52 on one end of the band and a tongue 54 on the opposite end thereof, the tongue 54 being provided with screw threads whereby when the nut 50 is tightened the band 48 is clamped tightly to the clamp members 42 and 44 thereby squeezing said members tightly against the outer periphery of the flanges 18 and 20, and holding said flanges in coupled condition.

When it is desired to uncouple the coupling assembly 10, the worm wheel 26 is rotated in such a direction that as the nipple 22 is rotated the interaction of the screw threads 32 and 34 causes the nipple 22 to be moved to the position shown in FIG. 2. At this point, the band 48 is removed and the semi-circular clamp members 42 and 44 are removed from the flanges 18 and 20, thereby allowing disassembly of the coupling. Due to the retracted position of the nipple 22, the need for longitudinal movement of the coupling elements 12 and 16 relative to one another is eliminated.

Thus the instant invention provides a demountable pipe coupling readily adapted for connection to pipes and/or hoses and which is of such a nature that it is simple and foolproof in construction, and eliminates the need for longitudinal movement of the coupled pipes or hoses relative to one another, as has heretofore been the case with most prior art couplings. The intsant coupling 10 provides the advantageous features of a coupling having a nipple portion on one coupling section thereof which serves to insure a fluid tight fit and a more rigid fit between the coupling sections, but at the same time eliminates the drawbacks of such a coupling by making the nipple portion selectively retractable into one of the coupling sections so that the coupling sections may be separated from one another without the necessity of longitudinally moving one coupling section relative to another.

It should be understood, of course, that the foregoing disclosure relates only to a preferred embodiment of the invention and that numerous modifications and alterations may be made therein without departing from the spirit and scope of the invention as set forth in the appended claims.

What is claimed is:

1. A demountable pipe coupling comprising, a first coupling section and a second coupling section, a nipple movably mounted within said first coupling section and movable longitudinally thereof, a plurality of gear teeth on the outside of said nipple and peripherally spaced thereabout, a worm-wheel rotatably mounted on the inside of said first coupling section in engagement with said gear teeth so that rotation of said worm-wheel causes rotation of said nipple about its longitudinal axis, means for translating said rotary nipple movement into longitudinal movement so that rotation of said nipple causes movement of said nipple either into said coupling section or outwardly therefrom beyond the free end of said coupling section and into said second coupling section, said first coupling section containing an annular recess, a first O-ring mounted in said annular recess of said first coupling section for insuring a watertight fit at one end of said nipple, said second coupling section containing an annular recess, a second O-ring mounted in said annular recess of said second coupling section for insuring a watertight fit at the other end of said nipple, so that said first coupling section and said second coupling section cooperate with said nipple and said first and second O-ring to form a watertight enclosure for said worm-wheel whereby said worm-wheel is isolated from the fluid flowing within the pipe coupling and clamping means surrounding said coupling sections and holding said coupling sections against longitudinal movement therebetween, the outside diameter of said clamping means being the largest diameter of said demountable pipe coupling whereby said demountable pipe coupling forms a compact unit.

2. A demountable pipe coupling as set forth in claim 1 wherein the means for translating the rotary motion of the nipple into longitudinal motion comprises a plurality of screw threads formed on the outside surface of said nipple adjacent to but spaced from one of its ends, and a plurality of cooperating screw threads formed on the interior of the first coupling section and extending inwardly therefrom, said two groups of screw threads being in engagement with one another so that rotation of the nipple is translated into longitudinal movement of said nipple relative to the coupling section within which it is mounted.

References Cited in the file of this patent
UNITED STATES PATENTS

| | | |
|---|---|---|
| 779,479 | Howell | Jan. 10, 1905 |
| 1,194,236 | Richards | Aug. 8, 1916 |
| 1,831,956 | Harrington | Nov. 17, 1931 |
| 2,862,731 | Hedden | Dec. 2, 1958 |

FOREIGN PATENTS

| | | |
|---|---|---|
| 547,116 | Canada | Oct. 8, 1957 |